Oct. 18, 1932.  J. V. GIESLER  1,882,802
METHOD AND MACHINE FOR TESTING THIN STRIPS
Filed Dec. 27, 1926   3 Sheets-Sheet 1

Fig.1.

Inventor
Jean V. Giesler,
By Mauro, Cameron, Lewis & Kerkam,
Attorneys

Oct. 18, 1932.  J. V. GIESLER  1,882,802
METHOD AND MACHINE FOR TESTING THIN STRIPS
Filed Dec. 27, 1926  3 Sheets-Sheet 2

Oct. 18, 1932.  J. V. GIESLER  1,882,802

METHOD AND MACHINE FOR TESTING THIN STRIPS

Filed Dec. 27, 1926   3 Sheets-Sheet 3

Inventor
Jean V. Giesler
By Mauro, Cameron, Lewis & Kerkam
Attorneys

Patented Oct. 18, 1932

1,882,802

UNITED STATES PATENT OFFICE

JEAN V. GIESLER, OF KNOXVILLE, TENNESSEE, ASSIGNOR, BY MESNE ASSIGNMENTS, TO THE FULTON SYLPHON COMPANY, OF KNOXVILLE, TENNESSEE, A CORPORATION OF DELAWARE

METHOD AND MACHINE FOR TESTING THIN STRIPS

Application filed December 27, 1926. Serial No. 157,250.

This invention relates to a method and machine for testing pieces under repeated, reversed bending stresses.

It has heretofore been customary in studying the endurance limit of metals to subject the test pieces to repeated and completely reversed bending stresses in a machine wherein the test piece constitutes a loaded rotatable beam, the fibers of the test piece being thereby alternately subjected to stresses of tension and compression.

It is an object of this invention to provide a method and machine for studying endurance limit, by subjecting test pieces to repeated and completely reversed bending stresses, wherein the test pieces are not treated as loaded rotatable beams and yet wherein the fibers of the test pieces are alternately subjected to stresses of tension and compression in a simple, accurate and efficient manner.

Another object of this invention is to provide a method and machine of the character described which provides for ready adjustment so that test pieces may be subjected to different magnitudes of stresses, or to a uniform or a variable tensile stress in conjunction with the bending stresses.

Other objects of the invention relate to a method and machine of the character described which avoid complex stresses so that the total stress to which the test piece is subjected may be readily calculated by known formulæ and in which the variables of the formulæ may be accurately measured; which avoid localized stresses or unintended or indeterminate stresses which may upset the accurate measurement of the variables or the accurate determination of the stress; which are particularly suitable for test strips of very thin metal, on the order of ten thousandths of an inch in thickness, for example, and which do not require that the test pieces be especially narrow.

Other objects of the invention relate to the provision of a method and machine of the character described which enables the test piece to be subjected to simple bending stresses, or to bending stresses in conjunction with a constant tensile stress, or to bending stresses in conjunction with a variable tensile stress, which may vary from zero to a maximum or between predetermined minimum and maximum values, which stresses may be varied in magnitude through a wide range so that the relation of the number of complete reversals of bending stress to the magnitude of the stresses may be readily ascertained for the plotting of an S—N diagram and a study of endurance limits under a wide variety of conditions in order that the relative capacity of different metals and the effect of various treatments of the same may be readily studied.

Other objects will appear as the description of the invention proceeds.

The invention is capable of being carried out in a variety of ways and of being embodied in a variety of mechanical constructions, one of which constructions has been shown on the accompanying drawings, but it is to be expressly understood that the drawings are for purposes of illustration only and are not to be construed as a definition of the limits of the invention, reference being had to the appended claims for that purpose.

Referring in detail to the drawings, wherein the same reference characters are employed to designate corresponding parts in the several figures.

In studying the relative worth of different materials and the effects thereon of various characters of treatments in the capacity of such materials to withstand repeated flexure without rupture. it is desirable to subject test pieces of the materials under consideration or subjected to the treatments under consideration to repeated, completely reversed bending stresses. It is also desirable to be able to vary the magnitude of the stresses within considerable limits and to consider the effect of constant or variable tensile stresses in conjunction with the reversed bending stresses. In accordance with the present invention a method and machine have been provided which are simple and easy of operation and adjustment so that different test pieces may be readily tested under a wide variety of conditions and the magnitude of the stresses accurately and simply determined. As the method of this invention will be more readily understood after the explanation of the construction and operation of a suitable means for applying the bending stresses, reference will first be had to the machine illustrated on the drawings.

Figure 1:
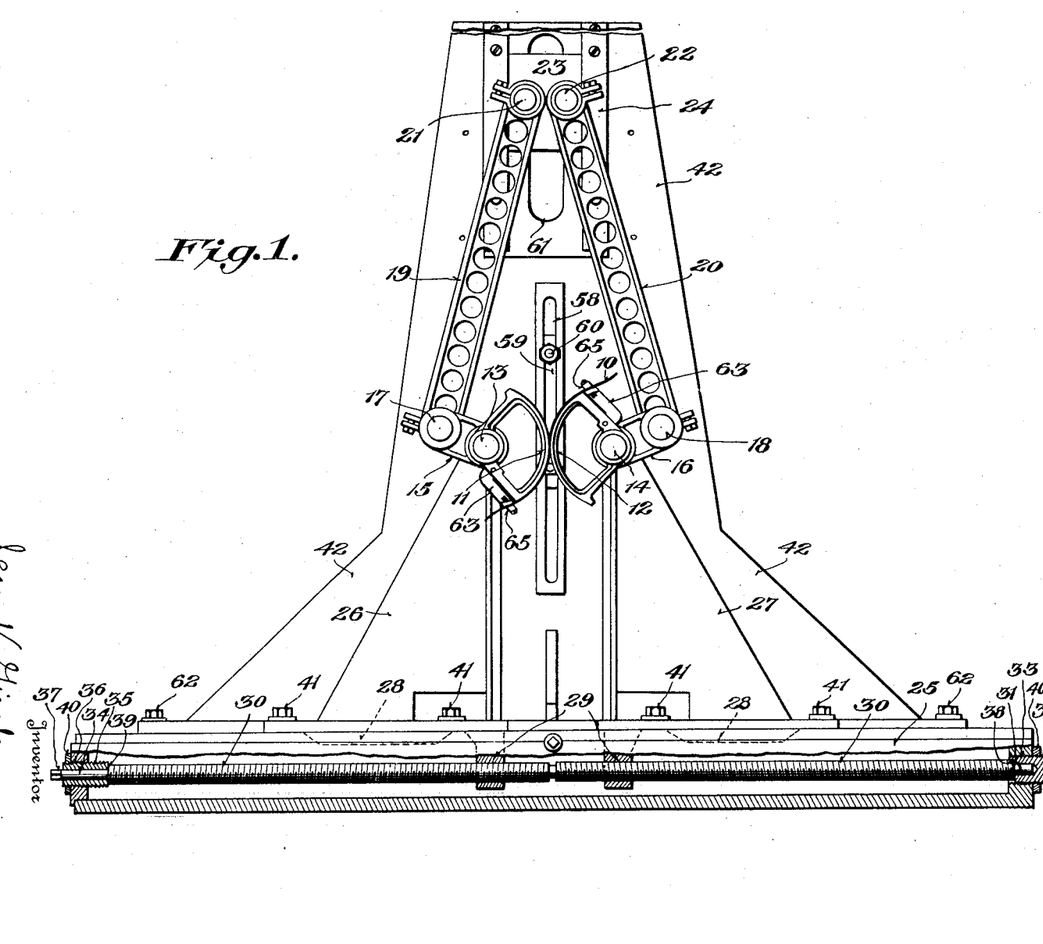
Fig. 1 is a more or less schematic elevation of a machine embodying the present invention and adapted to carry out the method of the present invention.
Figure 4:
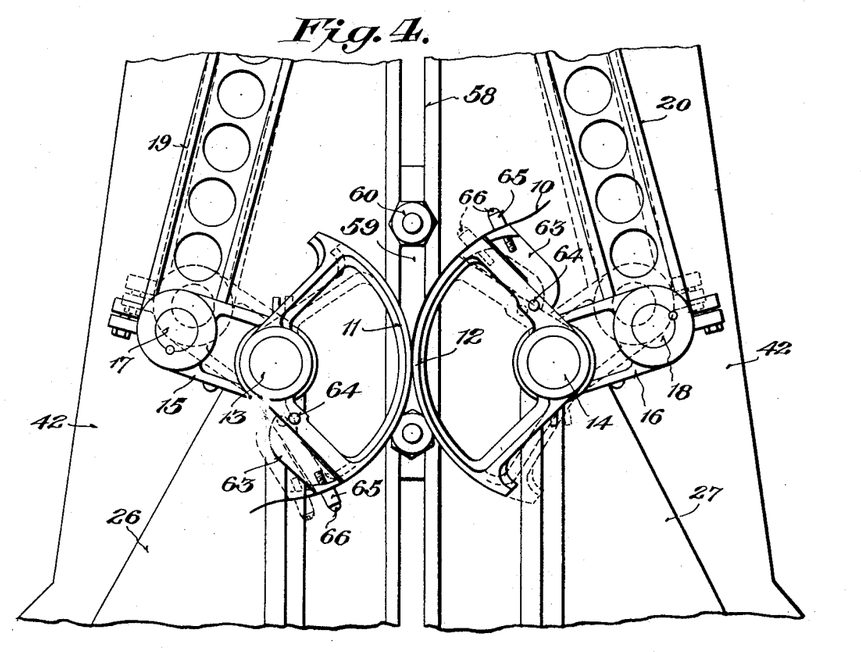
Fig. 4 is an enlarged front elevation of the sectors by which the test piece is subjected to repeated and completely reversed bending stresses.

In the form shown, the test piece 10 in the form of a strip of any suitable width and length is suitably clamped adjacent its opposite ends to a pair of opposed sectors 11 and 12, of equal radius of curvature, and mounted for oscillation on pivots or stub shafts, 13 and 14 respectively. Each of said sectors is provided with an arm, 15 and 16 respectively, which in turn are pivotally connected at 17 and 18 respectively, to connecting rods, 19 and 20 respectively. Said connecting rods are pivotally connected, at 21 and 22 respectively, to a crosshead 23 which may reciprocate in ways 24.

As crosshead 23 is reciprocated back and forth in its ways 24 the connecting rods 19 and 20 oscillate the sectors 11 and 12 to bend the test piece 10 first around one sector and then around the other sector in alternation as long as the machine is in operation. If the connecting rods 19 and 20 make equal angles with the center line of reciprocation of the crosshead 23 the movements of the sectors are exactly equal and the test piece is subjected only to a simple bending stress, and if the sectors are of exactly equal radius the stresses are equally reversed because, as the piece is alternately bent around the respective sectors, all portions of the test piece which are subjected to the reverse bending are bent equal amounts in opposite directions. As the magnitude of the bending stress is determined by the radius of curvature of the sectors, the stress to which the test piece is subjected may then be readily calculated by the formula $S = \dfrac{ET}{2R}$ where T equals the thickness of the piece, R equals the radius of the arc into which the test piece is bent taken from the neutral axis of the piece, and E equals Young's modulus of the metal under test. Where the thickness of the piece is very small in comparison with the radius of curvature into which it is bent, it is permissible to take the radius of the sector around which the piece is bent as the R of the formula.

By varying the sizes of the sectors, varying magnitudes of stresses may be obtained. By imposing a constant stress on the test piece in the direction of its length during the test, the effect of a constant tensile stress in conjunction with the repeated and completely reversed bending stresses may be ascertained. The effect of a varying tensile stress in conjunction with the repeated and completely reversed bending stresses can be studied by varying the amount of the stress in the direction of the length of the test piece in any suitable way. Thus the relative movements of the sectors can be varied by varying the relative angularity of the connecting rods 19 and 20 to the center line of reciprocation of the crosshead 23. Therefore, with a knowledge of the number of reciprocations of the crosshead 23 which produce rupture of the test pieces under given magnitudes and conditions of stress the endurance limit or the S—N diagram of test pieces of different materials or previously subjected to different treatments can be readily and accurately determined.

Figures 2, 3:
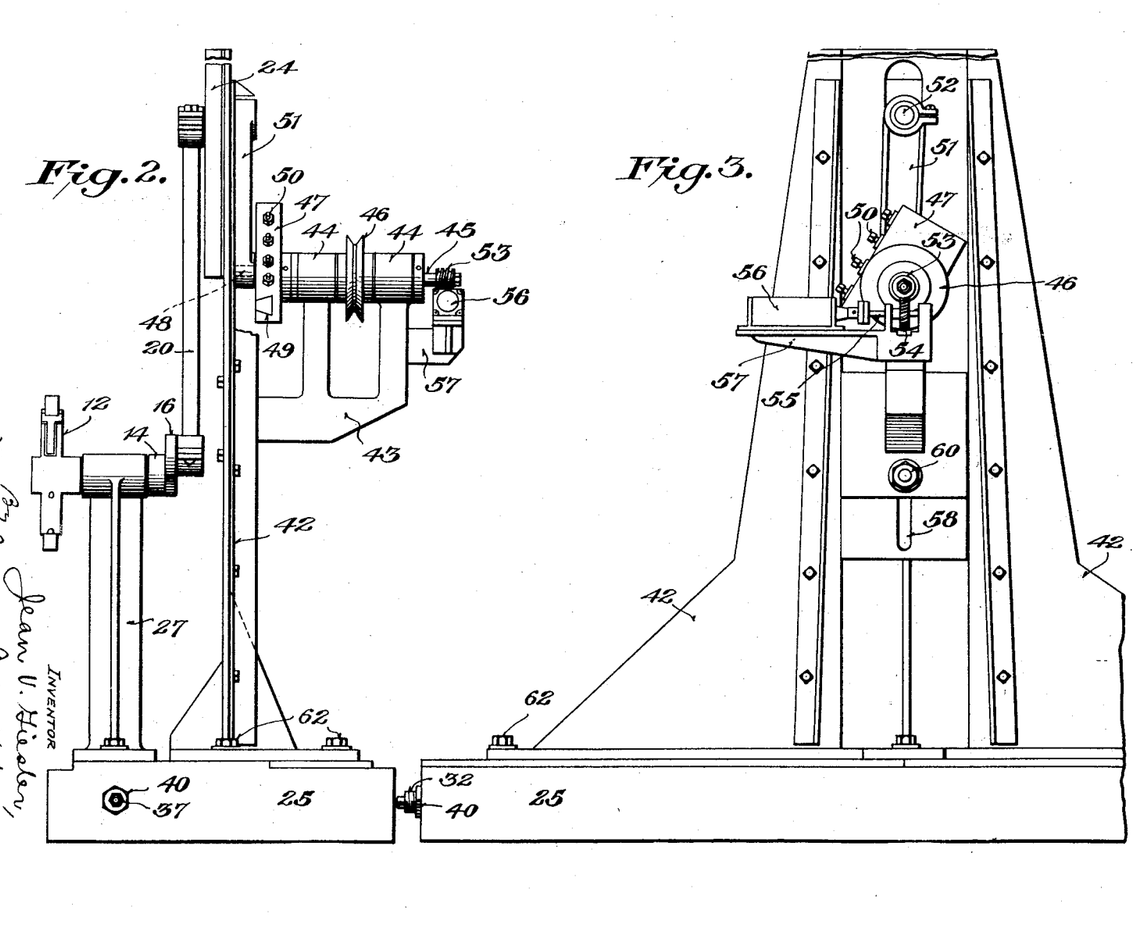
Fig. 2 is a side elevation of the machine of Fig. 1.
Fig. 3 is a rear elevation of the machine of Fig. 1.

The machine for carrying out the above method and for embodying the above principles may be of any suitable construction. In the form shown, a base 25 of any suitable size, construction and material is provided with a pair of upstanding brackets 26 and 27 which at their upper extremities carry the pivots or stub shafts 13 and 14 upon which the sectors 11 and 12 are mounted. Brackets 26 and 27 are mounted for guided linear movement toward and from each other, at right angles to the axes 13 and 14, in any suitable way, being shown as provided with an extended bearing on the upper surface of the base 25 and having depending ribs 28 which make a sliding fit in suitable slots in the top of said base. Means are provided for moving said brackets 26 and 27 toward and from each other, said means being preferably so constructed as to enforce equal and opposite movements of said brackets so that said brackets will always be in proper position for the coaction of a pair of sectors of equal radius of curvature, to whatever position they may be adjusted. In the form shown, each of said brackets carries a depending lug 29 having an interiorly threaded aperture, and mounted in the base 25 is a long threaded rod 30 having right and left hand threads of equal pitch at its opposite ends, the lugs 29 having corresponding right and left hand threads for coaction with the threads on said rod 30. Hence when the rod 30 is rotated the brackets 26 and 27 will be made to approach or recede from each other by equal increments, depending upon the direction of rotation of the unitary threaded rod 30.

In order that the brackets 26 and 27 may both be moved together in either direction in order to dispose the connecting rods 19 and 20 at different relative angles to the center line of reciprocation of the crosshead 23, means are also provided for shifting the threaded rod 30 bodily in the direction of its length. In the form shown, one end of said rod is reduced in diameter as shown at 31 and has a bearing in an exteriorly threaded block 32 which engages in an interiorly threaded aperture 33 in the end wall of the base 30. The opposite end of the rod 30 has a portion 34 of reduced cross section which has bearing in an exteriorly threaded block 35 which engages in an interiorly threaded aperture 36 in the end wall of the base 25. Reduced portion 34 extends to the exterior of the block 35 where it may be squared as shown at 37 to receive a crank or other suitable means for rotating said rod 30. The threaded rod 30 is normally prevented from endwise movement by the engagement of its shoulders 38 and 39 with the ends of the bearing blocks 32 and 35 respectively, but may be moved endwise by adjustment of said bearing blocks in the threaded apertures 33 and 36 respectively. Said bearing blocks may be retained in their adjusted position by lock nuts 40.

Brackets 26 and 27 may also be fixedly secured in any of their adjusted positions by tightening clamp screws 41, or in any other suitable way.

Base 25 is also provided with a broad rear bracket 42 in which the ways 24 for the crosshead 23 are provided in any suitable way. Bracket 42 also carries a rearwardly extending bracket 43 which provides bearings 44 for a shaft 45 on which is mounted a pulley 46 or any other suitable means for rotating said shaft. Shaft 45 at its inner end carries a crank disk or block 47 which is preferably so constructed as to provide adjustment for the radius of rotation of the crank pin 48, being shown as provided with a dovetail way 49 and a plurality of clamping screws 50 to the end that the crank pin may be variously positioned in said way and clamped in adjusted position. Extending from the crank pin 48 is a connecting rod 51 pivoted to the crosshead 23 at 52.

Means are preferably provided for counting the number of rotations of the shaft 45, and therefore the number of reciprocations of the crosshead 23. Any suitable means may be provided for this purpose, the shaft 45 being shown as provided with a worm 53 which meshes with a worm-wheel 54 carried by the shaft 55 of a counting mechanism 56, of any suitable construction, supported on a lateral extension 57 of the bracket 43.

Bracket 43 is preferably mounted for vertical adjustment on the bracket 42 so that as sectors of different radii of curvature are mounted on the pivots or stub shafts 13 and 14, the crosshead 23 and its driving mechanism may be adjusted to the end that the medial points of said sectors may be in opposition when the crosshead is at the middle of its stroke. In the form shown, the bracket 42 is provided with an elongated vertical slot 58 in which a projection or rib 59 on the bracket 43 may slide, and suitable clamping screws 60 are provided for retaining the bracket 43 in adjusted position. Bracket 42 also has an elongated vertical slot 61 of sufficient extent to provide for the reciprocating movements of the pivot pin 52, by which the crank 51 is connected to the crosshead 23, for all positions of adjustment of the driving mechanism for the crosshead. Bracket 42 is also fixedly secured to the base 25 in any suitable way as by a plurality of clamping screws 62.

Any suitable means are provided for attaching the test piece to the sectors 11 and 12. In the form shown, each of said sectors carries an arm 63 which is pivoted to an arm of the sector, as at 64, and each of said arms carries a clamping member 65 and a set screw 66 whereby the test piece may be clamped to the end of the arm 63, which is preferably so shaped as to constitute a continuation of the curvature of the periphery of the sector when the arm is disposed alongside of the edge of the sector. When the test piece breaks under the repeated bending stresses the arm 63 will move away from its sector under the action of inertia as the sector oscillates, and advantage may be taken of this relative movement of the arm to stop the machine or to give notice of the rupture of the test piece, as by the closing of an electrical contact when arm 63 moves away from its normal position. If desired, the movement of the arm 63 away from normal position upon the rupture of the test piece may be positively effected by attaching a light spring thereto so as to insure the desired movement of the arm 63 upon rupture of the test piece.

Figure 5:
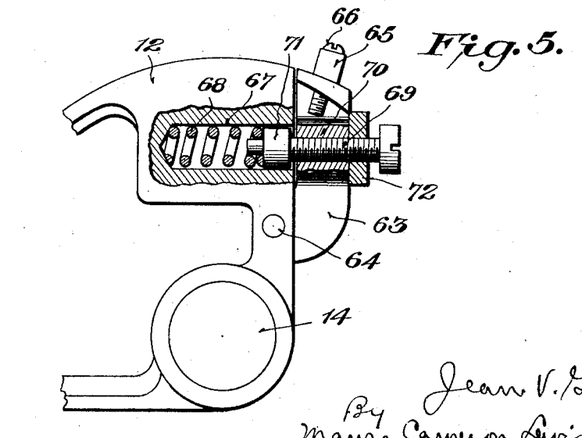
Fig. 5 is a further enlarged, partly sectional view of means for imposing and adjusting the magnitude of the tensile stresses.

When it is desired to study the effect of a constant tensile stress in conjunction with the bending stresses, or a variable tensile stress in conjunction with the bending stresses, one or both of each pair of sectors are preferably provided with means for imposing a constant or a variable tensile stress, as the case may be, on the test piece being subjected to the reverse bending action of said sectors. In the structure shown in Fig. 5 means are provided whereby a constant tensile stress may be imposed on the test piece and said means may be operated in conjunction with the disposition of the sectors so that the connecting rods 19 and 20 are at different angles to the center line of reciprocation of the crosshead 23 for imposing a variable tensile stress on the test piece. As shown in Fig. 5, the sector is provided with a cylindrical recess 67 which houses a coil spring 68, and the pivoted arm 63 carries a screw 69 which works in a threaded aperture of said arm 63. The inner end of said screw 69 is provided, in any suitable way, with a collar 71 which bears against the coil spring 68, the opposite end of which seats in the bottom of the recess 67. A lock nut 72 is provided on the screw 69 exteriorly of the arm 63, so that said screw may be locked in its various positions of adjustment. By rotating the screw 69 it may be made to project into the recess 67 to a greater or less extent, and if a test piece is clamped to the arm 63 so as to prevent relative movement of said arm with respect to the sector, the spring 68 will be put under various extents of compression whereby it will react to impose a predetermined tension on the test piece subjected to the reverse bending stresses. If the angularity of the two connecting rods 19 and 20 to the center line of reciprocation of the crosshead 23 is equal, the tensile stress imposed by the spring 68 will be constant. If the brackets 26 and 27 are adjusted, however, so that said connecting rods make unequal angles with the center line of reciprocation of the crosshead 23, the rate of movement of the sectors will be different and the test piece will tend to rotate the arm 63 with respect to its sector. Therefore the tension of the spring 68 will vary as the crosshead 23 moves from one end of its stroke to the other and, by suitably adjusting the spring 68, the variation in the tensile stress imposed thereby on the test piece may be from zero to a given maximum or from a given minimum to a given maximum, and by suitably designing the spring mechanism shown in Fig. 5, the extent of these minimum and maximum values of the tensile stress may be varied within the desired limits.

In operation the pulley 46 is driven from any suitable source of power and by its rotation of the shaft 45 the crank 47, 48 drives the connecting rod 51 to reciprocate crosshead 23 in its ways 24. As the crosshead 23 reciprocates, the connecting rods 19 and 20 rock the sectors 11 and 12 about their pivots or stub shafts 13 and 14, the direction of rotation of the two sectors around their respective axes being opposite but opposed points on the sectors moving in the same direction as viewed in the direction of the center line of reciprocation of the crosshead 23. The active length of each of the sectors 13 and 14 is approximately equal to the length of the portion of the test piece that is being actively tested, while the radii of curvature of said sectors are large as compared with said length. Therefore, as the sectors 11 and 12 rock back and forth on their pivots 13 and 14 the test piece 10, secured adjacent its opposite extremities to said sectors, is alternately wrapped around one sector and then wrapped around the other sector, moving bodily or reciprocating in opposite directions in a sinuous path that is fixed in space and provides reversed directions of curvature so that the test piece is moving in a progressively changing ogee curvature, the simple reversed bend thereby formed periodically traversing the material from end to end of the actively tested portion, being thereby bent back and forth by amounts determined by the radius of curvature of the sectors being used, and all portions of the test piece being bent to equal amounts, and progressively along the length of the test piece, when the sectors have a uniform radius of curvature. As both sectors preferably have the same radius of curvature, the extent to which the test piece is bent in opposite directions is the same.

The test piece may thus be subjected to repeated and completely reversed bending stresses until it ruptures. The number of repetitions of reversals of bending is known by noting the number of revolutions of the shaft 45 as indicated by the counter 56, while the magnitude of the bending stress to which the test piece is subjected can be simply calculated from the aforesaid formula by knowing the thickness of the test piece, the radius of the sectors and Young's modulus of the piece under test. Therefore the endurance limit of the test piece may be readily determined.

By using different pairs of sectors having different radii of curvature the endurance limit of test pieces under different stresses can be determined, and from this data the S—N diagram may be plotted. To this end the sectors 11 and 12 are mounted on their pivot pins or stub shafts 13 and 14 and their extension arms 15 and 16 are connected to the connecting rods 19 and 20 in any suitable way to facilitate ready replacement.

When mounting a different pair of sectors on the pivots 13 and 14 the supports 26 and 27 should be adjusted to separate said pivots for sectors of larger size and to cause said pivots to approach each other for sectors of smaller size, so that said pivots will be spaced apart a distance substantially equal to the sum of the radii of the sectors plus the thickness of the test piece. Moreover, in so adjusting said pivots, their movements should be equal and opposite so that they shall be equally spaced from the center line of reciprocation of the crosshead 23. This adjustment is effected by rotating the threaded rod 30, as by the application of a crank to squared end 37, and the two brackets 26 and 27 will be made to approach or recede from each other by equal increments by reason of the equally pitched right and left hand threads on the opposite ends of said rod 30 coacting with the threaded lugs on the brackets.

Therefore this method and apparatus afford a ready means for studying and comparing the endurance limit and characteristics of different materials or of any given material under different conditions of heat treatment, cold working, annealing, etc. The effect of a constant tensile strength in conjunction with the repeated and reversed bending stresses can similarly be determined by imposing an initial stress in the direction of the length of the test piece by adjusting the spring 68 after the test piece has been clamped onto the sectors. The effect of a variable tensile stress in conjunction with the repeated and reversed bending stresses can be ascertained by rotating bearing blocks 32 and 35, after the lock nuts 40 have been loosened, so as to shift the rod 30 and the brackets 26 and 27 in one direction or the other so that the connecting rods 19 and 20 make unequal angles with the center line of reciprocation of crosshead 23. In this position of adjustment the movements of the sectors are unequal and, with a suitable tension imposed on the test piece through spring 68, a variable tensile force is exerted on the test piece as the latter is bent back and forth around the sectors, the magnitude of the maximum and the minimum of this variable force depending upon the conditions of adjustment. The effect of constant or variable tensile stresses can be ascertained with bending forces of different magnitudes by substituting different pairs of sectors and properly adjusting the machine, and therefore the endurance limit of various materials and of any desired material under various conditions of treatment can be ascertained under various conditions of constant or variable tensile stress as well as under conditions of simple bending stress.

Provision is also made whereby the length of stroke of crosshead 23 may be varied and therefore the extent of the test piece which is wrapped back and forth upon the pairs of sectors may be adjusted.

It will therefore be perceived that a method and machine for subjecting test pieces to repeated and completely reversed bending stresses have been provided wherein the test piece is not rotated as a loaded beam and yet wherein the fibers of the test piece are repeatedly and alternately subjected to equal conditions of compression and tension under bending, these stresses being equal in opposite directions and equally applied throughout so far as the test piece is bent reversely. The method and machine moreover readily provide for the use of a wide variety of magnitudes of bending stress, and the study of the effects of constant and variable tensile stresses in conjunction with the bending stresses of different magnitudes.

It will also be perceived that the method and machine are such as to introduce no complex or indeterminate stresses, so that the magnitude of the stresses imposed may be simply and accurately determined by the use of simple formulæ the variables of which may be readily and accurately ascertained. The machine is also simple in construction and easy to operate and adjust so that the work of running a large number of tests under varying conditions is greatly simplified. Furthermore, the method and machine are particularly suitable for testing relatively thin strips of metal, of the order of ten thousandths of an inch in thickness, while the test piece need not be particularly narrow as in the case of the testing of wires.

While the machine is particularly designed for the study of the effect of simple bending stresses which are repeatedly and completely reversed, the machine is capable of use in studying more complex stresses. Thus more complex bending stresses may be studied by the use of pairs of sectors which are of unequal size, or by the use of sectors whose operative surfaces are not arcs of circles, etc.

While the preferred method and the illustrated embodiment of the machine have been described with considerable particularity, it is to be expressly understood that the invention is not restricted thereto, as the invention is capable of being carried out in other ways and embodied in other machines, as will be readily apparent to those skilled in the art, while changes may be made in the details of construction, arrangement and proportion of parts without departing from the spirit of this invention. Reference is therefore to be had to the claims hereto appended for a definition of the limits of the invention.

What is claimed is:

1. The method of testing a thin strip of material by subjecting the same to repeated and reversed bending stresses which includes alternately bending said strip progressively upon opposed curved surfaces while exerting a tensile stress lengthwise of said strip, and automatically varying the magnitude of said tensile stress during the progression of said bending.

2. The method of determining the endurance limit of thin material under simple bending stresses which includes subjecting each of a plurality of thin strips of the material to repeated and reversed bending stresses until ruptured upon a pair of curved surfaces, the respective strips being subjected to surfaces of diffrent radii of curvature.

3. The method of determining the endurance limit of thin material under simple bending stresses which includes subjecting each of a plurality of thin strips of the material to repeated and reversed bending stresses until ruptured by progressively bending each strip to predetermined curvature, the respective strips being bent to different radii of curvature.

4. The method of determining the endurance limit of thin material under simple bending stresses which includes subjecting each of a plurality of thin strips to repeated and reversed bending stresses by subjecting each strip to the action of a pair of opposed oscillating curved surfaces until ruptured, said surfaces having different radii of curvature for the different strips.

5. In a machine for testing thin strips of material by subjecting the same to repeated and reversed bending tests, a pair of members having opposed curved surfaces, means for attaching a test piece at its opposite ends to the respective members, and means for continuously oscillating said members alternately in opposite directions to alternately bend the test piece upon the respective surfaces.

6. In a machine for testing thin strips of material by subjecting the same to repeated and reversed bending tests, a pair of members having opposed surved surfaces of the same curvature, means for attaching a test piece at its opposite ends to the respective members, and means for continuously oscillating said members alternately in opposite directions to alternately bend the test piece oppositely to equal extents upon the respective surfaces.

7. In a machine for testing thin strips of material by subjecting the same to repeated and reversed bending tests, a pair of members having opposed circularly curved adjacent surfaces, means for attaching the test piece at its opposite ends to the respective members to hold said test piece in an ogee curve, and means for oscillating said members to bend the test piece alternately and equally along its length upon the respective surfaces.

8. In a machine for testing thin strips of material by subjecting the same to repeated and reversed bending tests, a pair of members having curved adjacent surfaces, means for mounting said members oscillatably with said curved surfaces in opposition, and means for continuously oscillating said members simultaneously.

9. In a machine for testing thin strips of material by subjecting the same to repeated and reversed bending tests, means for supporting pairs of members having opposed curved surfaces, means for attaching a test piece to said members at its opposite ends, and means for continuously oscillating said members to bend the test piece alternately upon said opposed surfaces, said last-named means cooperating with said members to produce equal rates of movement thereof.

10. In a machine for subjecting thin strips of material to repeated and reversed bending tests, means for supporting pairs of members having opposed curved surfaces, means for attaching a test piece to said members at its opposite ends, means for oscillating said members to bend the test piece alternately upon said opposed surfaces, and means for adjusting said supporting means to accommodate pairs of members having surfaces of different radii of curvature.

11. In a machine for subjecting thin strips of material to repeated and reversed bending tests, means for supporting pairs of members having opposed curved surfaces, means for attaching a test piece to said members at its opposite ends, means for oscillating said members to bend the test piece alternately upon said opposed surfaces, and means for adjusting said supporting means to render the rate of oscillation of said members unequal.

12. In a machine for subjecting thin strips of material to repeated and reversed bending tests, a pair of supports adapted to carry members having opposed curved surfaces, means for adjusting said supports toward and from each other, means for attaching a test piece at its opposite ends to said members, and means for oscillating said members to alternately bend the test piece upon said opposed curved surfaces.

13. In a machine for subjecting thin strips of material to repeated and reversed bending tests, a pair of supports adapted to carry members having opposed curved surfaces, means for adjusting said supports toward and from each other, means for adjusting both of said supports in the same direction, means for attaching a test piece at its opposite ends to said members, and means for oscillating said members to alternately bend the test piece upon said opposed curved surfaces.

14. In a machine for testing thin strips of material by subjecting the same to repeated and reversed bending tests, a pair of supports for mounting pairs of members having opposed closely adjacent curved surfaces, and means for oscillating said members in opposite directions and at equal rates of movement.

15. In a machine for subjecting thin strips of material to repeated and reversed bending tests, a pair of supports for mounting pairs of members having opposed curved surfaces, means for oscillating said members, and means for adjusting said supports to accommodate different pairs of members having curved surfaces of different radii of curvature.

16. In a machine for subjecting thin strips of material to repeated and reversed bending tests, a pair of supports for mounting pairs of members having opposed curved surfaces, means for oscillating said members, and means for adjusting said supports with respect to said oscillating means in order to render the rate of oscillation of said members unequal.

17. In a machine for subjecting thin strips of material to repeated and reversed bending tests, a pair of supports for mounting pairs of members having opposed curved surfaces, means for oscillating said members, means for adjusting said supports to accommodate pairs of members having curved surfaces of different radii of curvature, and means for adjusting said supports to enable said oscillating means to effect different rates of oscillation of said members.

18. In a machine for subjecting thin strips of material to repeated and reversed bending tests, a pair of members having opposed curved surfaces, means for attaching a test piece at its opposite ends to said members, means for oscillating said members, and means for counting the number of oscillations of said members.

19. In a machine for subjecting thin strips of material to repeated and reversed bending tests, a pair of members having opposed curved surfaces, means for attaching a test piece at its opposite ends to said opposed surfaces, means for oscillating said members, means for counting the number of oscillations of said members, and means actuated by the breakage of the test piece whereby the number of oscillations required to break the same may be noted.

20. In a machine for testing thin strips of material by subjecting the same to repeated and reversed bending tests, a pair of supports adapted to pivotally support pairs of members having opposed curved surfaces, a rectilinearly movable member, and means connecting said rectilinearly movable member with said pivotally mounted members at opposite sides of their respective pivotal axes whereby reciprocation of said rectilinearly movable member is accompanied by simultaneous oscillatory movement of said members around their axes in opposite directions.

21. In a machine for subjecting thin strips of material to repeated and reversed bending tests, a pair of supports adapted to pivotally support pairs of members having opposed curved surfaces, a rectilinearly movable member, means connecting said rectilinearly movable member with said pivotally mounted members at opposite sides of their respective pivotal axes, and means for adjusting said supports to accommodate oscillatory members of different sizes.

22. In a machine for subjecting thin strips of material to repeated and reversed bending tests, a pair of supports adapted to pivotally support pairs of members having opposed curved surfaces, a rectilinearly movable member, means connecting said rectilinearly movable member with said pivotally mounted members at opposite sides of their respective pivotal axes, and means for adjusting said supports simultaneously and equally to maintain the same angular relation of said connecting means to the line of reciprocation of said rectilinearly movable member.

23. In a machine for subjecting thin strips of material to repeated and reversed bending tests, a pair of supports adapted to pivotally support pairs of members having opposed curved surfaces, a rectilinearly movable member, means connecting said rectilinearly movable member with said pivotally mounted members at opposite sides of their respective pivotal axes, and means to adjust said supports to vary the relative angularity of said connecting means to the line of reciprocation of said rectilinearly movable member.

24. In a machine for subjecting thin strips of material to repeated and reversed bending tests, a pair of supports adapted to pivotally support pairs of members having opposed curved surfaces, a rectilinearly movable member, means connecting said rectilinearly movable member with said pivotally mounted members at opposite sides of their respective pivotal axes, and means to adjust said rectilinearly movable member to maintain a predetermined relationship between the oscillatory members as oscillatory members of different sizes are mounted on said supports.

25. In a machine for subjecting thin strips of material to repeated and reversed bending tests, a pair of supports for mounting pairs of oscillatory members with opposed curved surfaces, means for oscillating said members, means including a crank mechanism for driving said oscillating means, and means for adjusting said crank mechanism.

26. In a machine for subjecting thin strips of material to repeated and reversed bending tests, a pair of supports for mounting pairs of oscillatory members with opposed curved surfaces, means for oscillating said members including a crosshead and links connecting said crosshead to said oscillatory members, and means for adjusting said crosshead relatively to said supports of said oscillatory members.

27. In a machine for subjecting thin strips of material to repeated and reversed bending tests, a pair of supports for mounting pairs of oscillatory members with opposed curved surfaces, means for oscillating said members, and equally pitched right and left hand screws for simultaneously adjusting said supports toward and from each other.

28. In a machine for subjecting thin strips of material to repeated and reversed bending tests, a pair of supports for mounting pairs of oscillatory members with opposed curved surfaces, means for oscillating said members, a reversely threaded rod for simultaneously adjusting said supports toward and from each other, and adjustable bearings for said rod for simultaneously adjusting said supports and said rod in the same direction.

29. In a machine for subjecting thin strips of material to repeated and reversed bending tests, means for supporting pairs of members having opposed curved surfaces, means for oscillating said members, means for attaching a test piece to said members at its opposite ends, and means for exerting tension on said test piece as said members are oscillated to bend said test piece alternately upon the respective curved surfaces.

30. In a machine for subjecting thin strips of material to repeated and reversed bending tests, means for supporting pairs of members having opposed curved surfaces, means for oscillating said members, and means for attaching a test piece to said members at its opposite ends, said attaching means including a device for imposing a tensile stress on said test piece as it is alternately bent upon said respective curved surfaces.

31. In a machine for subjecting thin strips of material to repeated and reversed bending tests, means for supporting pairs of members having opposed curved surfaces, means for oscillating said members, means for attaching a test piece to said members at its opposite ends, said means including an arm pivoted to one of said oscillatory members and clamping means carried by said arm, and means reacting between said arm and its oscillatory member for exerting a pull on a test piece clamped to said arm.

32. In a machine for subjecting thin strips of material to repeated and reversed bending tests, means for supporting pairs of members having opposed curved surfaces, means for oscillating said members, means for attaching a test piece to said members at its opposite ends, said means including a clamping arm pivoted to one of said oscillatory members and clamping means carried by said arm, a spring reacting between said arm and its oscillatory member, and means for adjusting said spring.

33. In a machine for subjecting thin strips of material to repeated and reversed bending tests, means for supporting pairs of members having opposed curved surfaces, means for oscillating said members, means for attaching a test piece to said members at its opposite ends, and means for exerting a variable tension on a test piece clamped to said oscillatory members as the test piece is alternately bent upon the respective curved surfaces.

34. The method of testing a thin strip of sheet material which includes subjecting the strip to repeated and reversed bending stresses by oscillating a pair of opposed members having surfaces of equal radius of curvature which is large as compared with the length of the actively tested portion of said strip and alternately bending said strip upon the respective curved surfaces to stress said strip oppositely by equal amounts.

35. The method of testing a thin strip of sheet material which includes subjecting the strip to repeated and reversed bending stresses by oscillating a pair of opposed curved segmental members and alternately bending said strip upon said curved members while exerting a tensile stress lengthwise of said strip.

36. The method of testing a thin strip of sheet material which includes subjecting the strip to repeated and reversed bending stresses by bending said strip first upon one and then upon the other of a pair of curved segmental members while exerting a constant tensile stress lengthwise of said strip.

37. A method of testing sheet material by causing a simple reversed bend to periodically traverse the material, while subjecting the same to synchronously varied tension.

38. The method of testing a thin strip of metal which includes subjecting the same to repeated and reversed bending stresses by alternately bending the strip in opposite directions into arcs of substantial radius of curvature but which arcs do not exceed semi-circles.

39. The method of testing a thin strip of sheet material which includes subjecting the strip to repeated and reversed bending stresses by alternately bending the strip upon opposed oscillating curved members to deflect said strip through arcs of substantial radii of curvature and not exceeding 180°.

40. The method of testing a thin strip of sheet material which includes subjecting the strip to repeated and reversed bending stresses by oscillating a pair of opposed curved members and alternately bending said strip into segmental arcs whose combined lengths approximate that of the portion of the strip being actively tested upon the respective curved surfaces to stress said strip in opposite directions.

41. The method of testing a thin strip of sheet material which includes subjecting the strip to repeated and reversed bending stresses by progressively bending the strip from end to end of the stressed portion and alternately in opposite directions into arcs whose combined lengths approximate that of the portion of the strip being actively tested.

42. The method of testing a thin strip of sheet material which includes subjecting the strip to repeated and reversed bending stresses by alternately bending the strip in opposite directions into segmental arcs upon curved members whose radii of curvature are large as compared with the length of the actively tested portion of the strip while exerting a tensile stress lengthwise of said strip.

43. The method of testing a thin strip of material which includes subjecting the same to repeated and reversed bending stresses by alternately bending the strip in opposite directions to less-than-circular arcs of fixed and predetermined curvatures the radii of which are large as compared with the length of the strip being actively tested.

44. The method of testing a thin strip of sheet material which includes subjecting the strip to repeated and reversed bending stresses by alternately bending the strip on a pair of opposed oscillating curved members into arcs of substantial radii of curvature and less-than-circular extent.

45. A method of testing sheet material by causing a simple reversed bend to periodically traverse the material from end to end of the actively tested portion to form arcs whose combined lengths approximate that of the actively tested portion of the strip.

46. A method of testing sheet material by causing a simple reversed bend to periodically traverse the material to form arcs whose combined lengths approximate that of the actively tested portion of the strip while subjecting the same to tension.

47. A method of testing sheet material by causing the material to reciprocate in a fixed path providing reversed directions of curvature in arcs whose length approximates that of the length of the actively tested portion of the strip.

48. The method of testing a thin strip of material which includes subjecting the same to repeated and reversed bending stresses by alternately and oppositely bending the strip in the direction of its thickness into segmental arcs of fixed curvature and whose combined lengths approximate the length of the actively tested portion of the strip.

49. The method of testing a thin strip of sheet material which includes subjecting the strip to repeated and reversed bending stresses by alternately bending the strip in opposite directions into segmental arcs upon opposed oscillating curved members whose length approximates that of the actively tested portion of the strip.

50. The method of testing a thin strip of sheet material which includes subjecting the strip to repeated and reversed bending stresses by progressively and alternately bending the strip from end to end of the stressed portion into opposite arcs whose combined lengths approximate the length of the actively tested portion of the strip while exerting a tensile stress lengthwise of said strip.

In testimony whereof I have signed this specification.

JEAN V. GIESLER.